Figure 4:
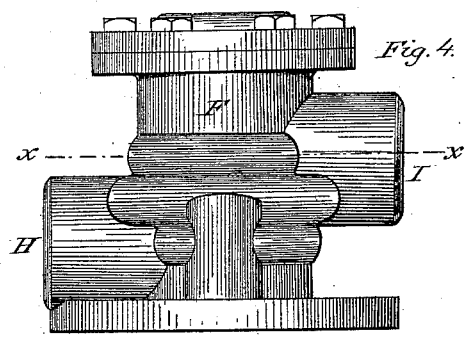

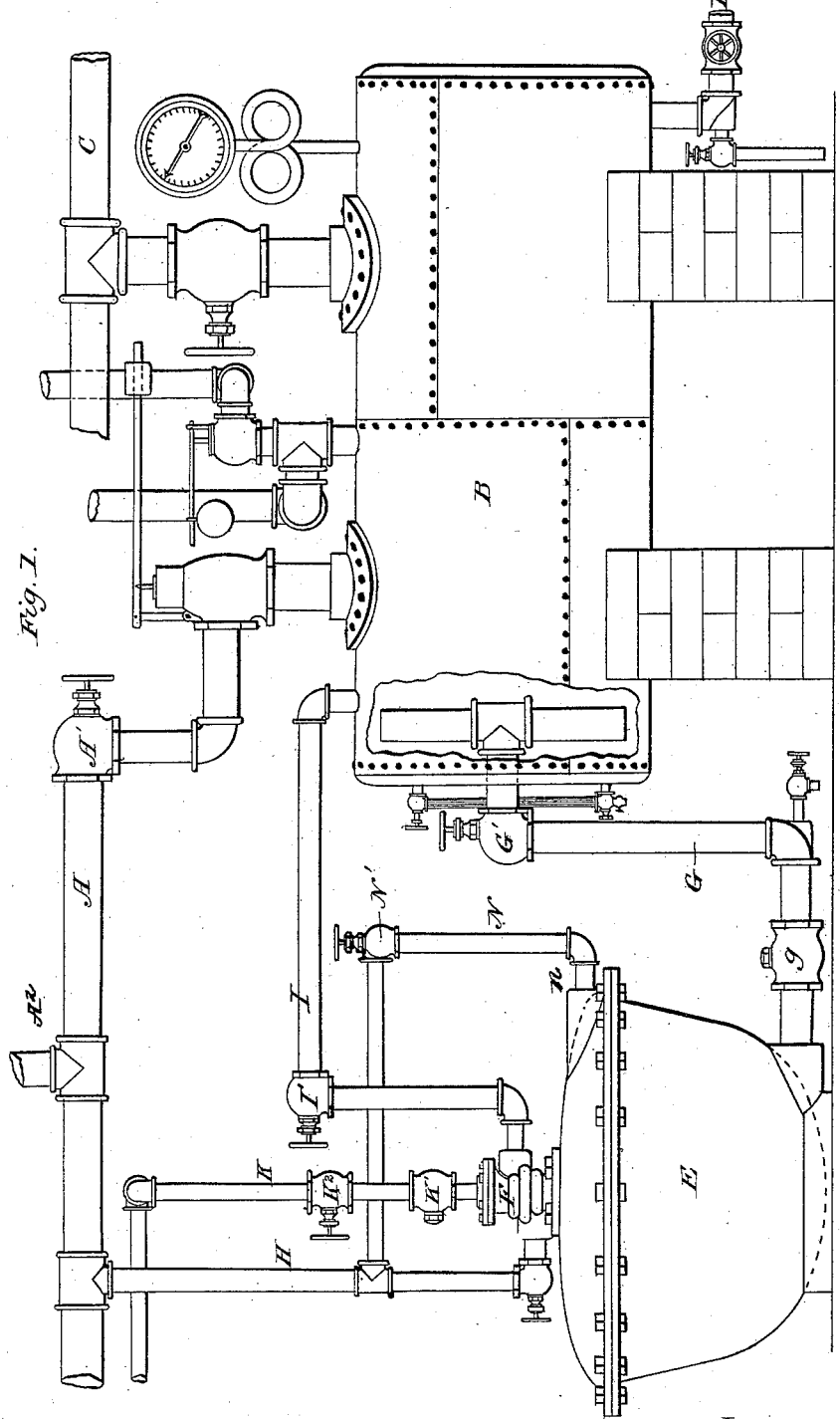

(No Model.) 3 Sheets—Sheet 2.
E. F. OSBORNE.
STEAM TRAP.
No. 300,003. Patented June 10, 1884.
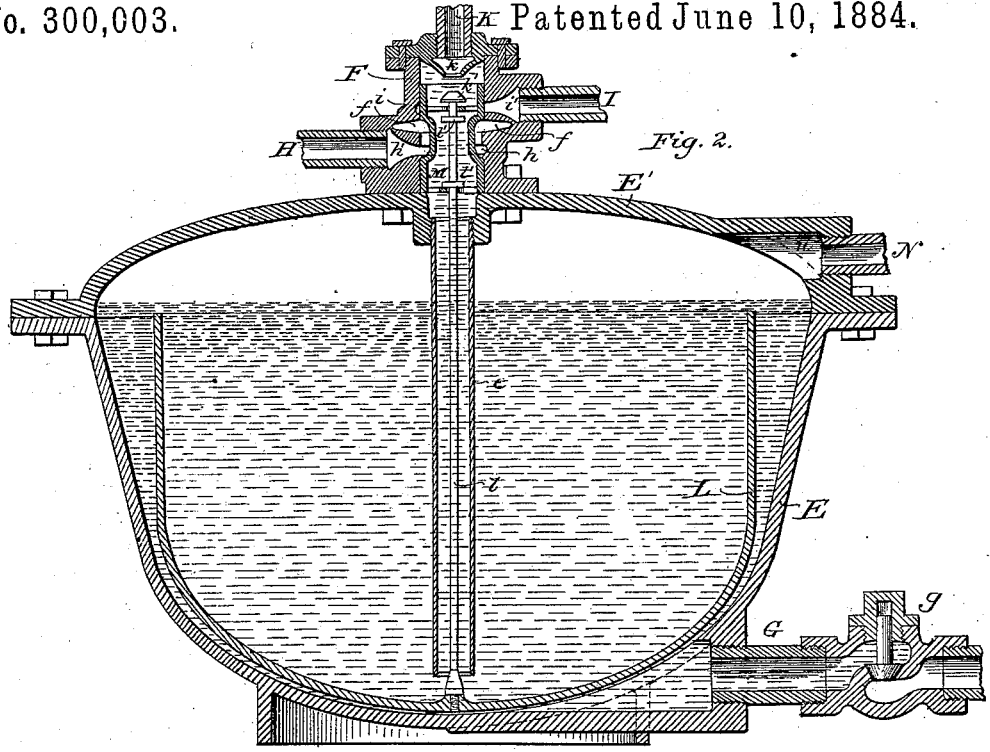
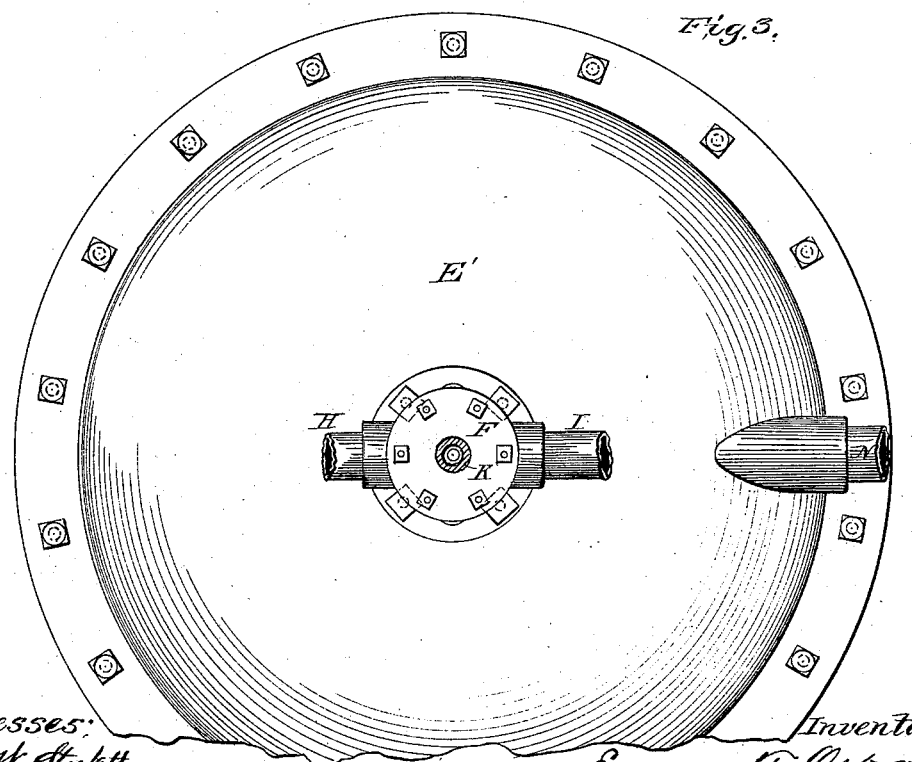
Witnesses:
Jno. W. Stockett
C. C. Poole
Inventor:
Eugene F. Osborne
per M. C. Davidson
Attorney (No Model.) 3 Sheets—Sheet 3.

E. F. OSBORNE.
STEAM TRAP.

No. 300,003. Patented June 10, 1884.

Witnesses:
Jno. W. Stockett.
C. C. Poole

Inventor:
Eugene F. Osborne
per M. E. Dayton
Attorney

UNITED STATES PATENT OFFICE.

EUGENE F. OSBORNE, OF ST. PAUL, MINNESOTA.

STEAM-TRAP.

SPECIFICATION forming part of Letters Patent No. 300,003, dated June 10, 1884.

Application filed March 2, 1883. (No model.)

*To all whom it may concern:*

Be it known that I, EUGENE F. OSBORNE, of the city of St. Paul, in the county of Ramsey and State of Minnesota, have invented certain new and useful Improvements in Steam-Traps; and I do hereby declare that the following is a full, clear, and exact description thereof, reference being had to the accompanying drawings, and to the letters of reference marked thereon, which form a part of this specification.

This invention relates to an improvement in steam-traps; and it consists in the matters hereinafter described, and pointed out in the claims.

The apparatus or trap herein illustrated as embodying my invention is operated by steam-pressure from any suitable generator, and may be used to take water from a receptacle either when such water is or is not under steam-pressure, and the said trap consists, essentially, of a closed receptacle or chamber, provided with an inlet-passage for water having in it an automatic valve for preventing a backward flow from the chamber, and with a water-exit passage, and is connected with a steam-supply pipe provided with a valve for controlling the admission of steam to the chamber, said valve being connected with and operated by a float in the chamber, so as to alternately admit steam from said supply-pipe to said chamber and exclude it therefrom. The float mentioned is operated by the inflowing water, so as to admit steam to the chamber when it has been filled with water, and to cut off the steam-supply at the moment that nearly all the water has been forced out by the steam-pressure, and the water-exit passage mentioned is provided with a valve, which is also operated by the said float, so that the said passage will be closed simultaneously with the closing of the steam-inlet, and the steam within the chamber thereby prevented from passing out through said water-exit. In order to permit the escape of this steam from the chamber, a fourth passage, having a valve operated by the float, is also provided, the said passage being opened during the time that communication with the steam-supply pipe is closed and water is entering the chamber. When the trap is used to take water from a receptacle in which it is under pressure, the passage last mentioned is connected with the steam-space of such receptacle, and serves to equalize the pressure in the chamber of the trap and in the said receptacle, and to thereby permit the water to flow freely by gravity from the latter to the former; but when the water is received into the chamber from a source in which it is not under pressure, the exhaust-steam may be permitted to pass from said passage into the open air, or elsewhere.

The trap above described is herein illustrated in connection with a steam supply and heating system having a central generating-plant, main steam-supply and condense-water return pipes and local apparatuses in the several buildings or other places to which steam is supplied, which are connected with the main system and comprise local supply and condense-water return pipes. In its use in connection with such steam-supply system, the chamber of the trap is arranged to receive the water of condensation from the return-pipe of the local apparatus, or from a reservoir or tank for receiving the condense-water of such local system, and the trap will, in such case, be operated by the steam-pressure of the main supply-system, and its exit-pipe will be connected to the return-main of the general system, so as to force the water of condensation through said main back to the vicinity of the steam-generator. In order to equalize the pressure in the local apparatus and in the chamber of the trap, so as to permit the condense-water from said apparatus to flow by gravity into the chamber, the exhaust-passage of said chamber is connected with the steam-supply pipe of the local system, or, when a reservoir under pressure is used for containing the condense-water from said local system, the said exhaust-passage is connected to the steam-space of said reservoir.

The trap above mentioned is herein illustrated in connection with a seal tank or reservoir connected with the return-pipes of a local heating system or circulation made in accordance with the construction described in Letters Patent No. 212,320, granted to me on the 18th day of February, 1879. This tank is intended to secure a continuous water seal to the several return-pipes leading from the radiators, and to this end is subject to an equalizing steam-pressure derived from connection with the supply-pipe of the circuit to which it belongs. In the use of the trap with this tank it becomes necessary to equalize the pressure between the said tank and the closed chamber of the trap in order to allow the water in the trap to flow freely into the said chamber, which is accomplished by connecting the steam-space of the tank with the upper interior of the chamber, as will further appear.

Figure 5:
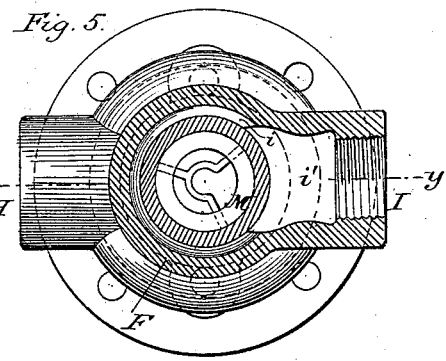
Figure 6:
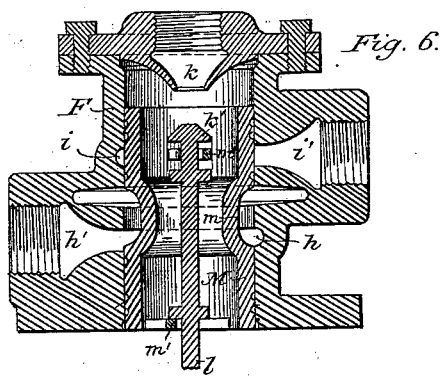
Figure 7:
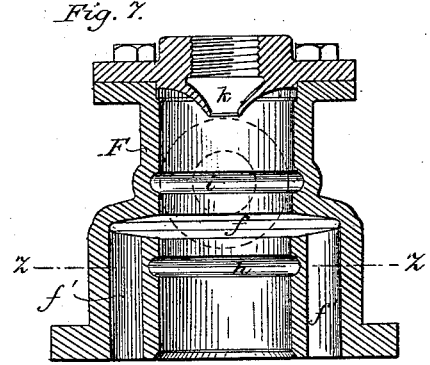
Figure 8:
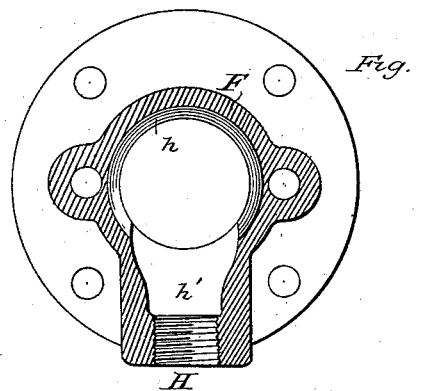
Figure 9:
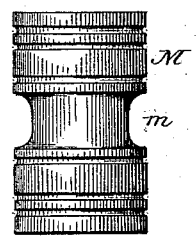

In the drawings, Figure 1 is a general view of my improved apparatus shown in connection with the seal-tank and the several connecting-pipes of the equalized-pressure system of steam-heating above mentioned. Fig. 2 is a transverse vertical section of the trap detached. Fig. 3 is a plan view of the same. Fig. 4 is a side view of the valve-casing belonging to said trap. Fig. 5 is a horizontal section on line $x\ x$ of Fig. 4. Fig. 6 is a vertical section on line $y\ y$ of Fig. 5. Fig. 7 is a similar section of the valve-casing with interior parts removed. Fig. 8 is a horizontal section on line $z\ z$ of Fig. 7. Fig. 9 is an exterior view of the valve-slide.

A is a steam-supply main pipe leading from a steam-generator at a central point to the local steam-heating system.

B is a reservoir seal-tank, which is shown as provided with several connections suited to the equalized-pressure system of steam-heating described in Letters Patent No. 212,320, before mentioned.

C is a pipe leading from the tank to supply steam to the several radiators or other condensing appliances of the heating apparatus, and D is the pipe for returning the water of condensation from such radiators and appliances to the tank B.

A' is a pressure-regulator or a reducing-valve, of any description, connecting the main A and the steam-supply pipe of the local apparatus.

E is a closed receptacle or chamber, having a tight cover, E', to the center of which is attached a valve-casing, F. The chamber E is placed below the level of the tank B, as shown, so as to receive water from said tank by gravity, and is connected to it by means of a pipe, G, which is provided with a check-valve, $g$, for preventing the backward flow of water in said pipe. The pipe G is connected with the interior of the tank B in such a manner as to take water from near the bottom thereof, as shown in Fig. 1. The valve-casing F is connected to the main steam-pipe A by a return-pipe, H, to the steam-space of the tank B by a pipe, I, and to a return-pipe, K, for conducting the water of condensation discharged from the chamber E back to the vicinity of the steam-generator. In the interior of the receptacle E is placed a bucket-float, L, to the bottom of the interior of which is attached a central vertical spindle, $l$. The exit-pipe K is connected to the cap of the casing F, which cap has on its lower surface a valve-seat, $k$, to which a valve-disk, $k'$, placed upon the upper extremity of the spindle $l$, is fitted. The interior of the valve-casing F is cylindrical, and in it is placed a vertically-movable hollow cylindric slide-valve, M, which properly fits the interior of said casing, and, as will be further explained, is operated by the spindle $l$, passing upwardly in the axis of the valve, as seen in Figs. 3 and 6. To the central portion of the cover E', and forming a continuation of the interior opening of the valve-casing F, is attached a depending tube, $e$, which surrounds the spindle $l$, and terminates in an open end at a point near the bottom of the float L. The tube $e$, hollow valve M, and valve-casing F form, as shown, a continuation of the pipe K to a point near the bottom of the chamber E. In the interior surface of the valve-casing F are formed two horizontal annular grooves or ports, $h$ and $i$, communicating with the pipes H and I by means of passages $h'\ i'$, respectively, as shown in Figs. 2, 5, 6, 7, and 8. Between the ports $h$ and $i$ in the interior face of the valve-casing F is formed a third annular port, $f$, which communicates with the interior of the receptacle E by means of two vertical passages, $f'\ f'$, Fig. 7. The slide-valve M has an exterior central annular groove, $m$, of sufficient width to embrace two of the ports mentioned, and said groove is arranged, as in an ordinary slide-valve, to afford communication between the ports $f$ and $h$ or $f$ and $i$, according to the position of the valve in its seat. The valve M is provided in its interior and near its ends with cross-bars $m'$, through which the spindle $l$ freely passes, and which form guides for said spindle. Upon the spindle $l$, between the cross-pieces $m'$, are placed two collars, $l'$, which come in contact with the said cross-pieces as the spindle is moved vertically by the motion of the float L and give a corresponding movement to said valve. The collars $l'$ are preferably placed as shown, so as to allow suitable lost motion between the spindle and the valve M, which latter is consequently moved only at the upper and lower extremities of the movement of the spindle.

The operation of the devices described is as follows: The receptacle E, when put in condition for operation, contains sufficient water outside of the float L to hold the said float at the upper limit of its movement. When in such position, the valve $k'$ is closed, and the slide-valve M being raised, the pipe I, connecting with the steam-space of the tank B, is in communication with the interior of the receptacle E, while the steam-supply pipe H is cut off from communication with said receptacle. The receptacle E is therefore subject to the pressure existing in the tank B, and as a consequence the water in said tank will be free to flow into the receptacle through the pipe G. When the incoming water, first filling the space about the float, finally overflows its edge and fills it, the float will sink, and in so doing it will first open the valve $k'$, and then by drawing the slide-valve M downward will close the opening to the pipe I and open communication between the steam-supply pipe H and the interior of the receptacle E. A high pressure of steam will thus be admitted to the receptacle E, and, acting on the surface of the water contained therein, will force the water in the float L upwardly through the valve $k'$ and pipe K against any pressure or head not greater than the steam-pressure in the pipe A. Any flow of water backward through the pipe G to the tank is prevented by the check-valve $g$. When all or most of the water has been forced from the float L, said float will again rise, and in so doing will again close the valve $k'$, and the operation described will be repeated, the high-pressure steam present in the receptacle E when the water has been forced therefrom being expanded or exhausted through the pipe I into the tank B. Such high-pressure steam is therefore not wasted, nor does it interfere with the movement of the water from the tank B. The special object of the valve $k$ is to close the exit-opening as soon as the water has all been forced from the interior of the float, so that the steam will not follow the water through the exit-pipe as it expands, but will be caused to exhaust through the pipe I into the tank, as described.

In the pipe K is placed a check-valve, K', Fig. 1, which prevents the water in said pipe from flowing back into the float L should the pressure in said pipe at any time exceed that in the chamber E plus the upward pressure of the float L against the valve-seat $k$.

Although I have shown and described the trap in connection with a tank containing water under steam-pressure, the same devices may be used for forcing the water from a reservoir in which it is not under pressure, the devices for equalizing the pressure in the reservoir or tank and the receptacle E being in such case unnecessary. When so used, the valve F may be constructed as before described, and the pipe I arranged to discharge the exhaust-steam into the open air, or the said pipe may be dispensed with and the exhaust-steam allowed to condense so as to permit the inflow of water to the chamber E. In the case last mentioned the valve M will be constructed so as to operate only to alternately admit steam from the pipe H to the chamber E and to cut it off therefrom.

The apparatus described operates to force the water of condensation into the return-main K with an intermittent action or by a series of pulsations. A continuously-acting device may, however, be constructed by using a double-chambered vessel and duplicate floats, and valves so constructed as to work alternately, which will obviously afford a constant or continuous passage of water through the return-pipe.

In Fig. 1 is shown a pipe, N, which connects the steam-supply pipe G with the top of the receptacle E at $n$. Such pipe is provided with a valve, N', which is kept closed in the ordinary operation of the apparatus, and the pipe N at such times performs no function. When, however, it is desired to shut the steam-supply from the local system and still retain it in the main supply-pipe for the purpose of running the engine therefrom or other purposes— as, for example, through a branch, $A^2$—the valves A', I', and G' are closed and the valve N' is opened. In such case any water of condensation in the pipe A may pass through the pipe N into the chamber E and be delivered into the return-pipe K.

The play or lost motion between the collars $l'$ $l'$ on the spindle $l$ and the cross-bars $m'$ in the valve M is not essential to the operation of the said valve, which may, if preferred, be attached rigidly to the spindle. The construction described is found desirable, however, from the fact that when the valve $k'$ is closed and the slide M is raised the weight of the float as it descends will act first to open the valve $k'$ and then to move the slide-valve, thus enabling both valves to be operated by a less weight or force than would be required if both were opened at once.

The pipe G, connecting the receptacle E and the tank B, is shown, Fig. 1, as connected to said tank so as to allow the overflow of water therefrom in the manner set forth in Letters Patent No. 269,223, granted to me on the 19th day of December, 1882, the object of such device being to take the water from near the bottom of the tank, and at the same time to prevent the water's level being lowered below the desired point at which it will afford a seal to the several return-pipes of the local system.

In case it is not desired to return the water of condensation to the steam-generator, such water may be discharged directly from the pipe K, and in such case the function of the apparatus as a pump for forcing water against a hydraulic head or other pressure would cease, and it would merely act in the capacity of a steam-trap for discharging the water of condensation from the condensed-water tank.

I claim as my invention—

1. The combination, with a steam-supply pipe and a source or means of water-supply, of a closed chamber constructed to receive water by gravity, and provided with an exit therefor, automatic means constructed to alternately admit steam from said supply-pipe to said chamber and cut it off therefrom, and automatic means constructed to close said water-exit simultaneously with the cutting off of the supply of steam to the chamber, whereby water is alternately allowed to flow into the said chamber and forced therefrom by steam-pressure, substantially as described.

2. The combination, with a steam-supply pipe and a pipe communicating with a source or means of water-supply, of a closed chamber having a water-inlet provided with an inwardly-opening check-valve, a water-exit, and a steam-exit, automatic means for alternately admitting steam from said supply-pipe to said chamber and cutting it off therefrom, and automatic means for closing said water-exit and opening said steam-exit during the time that communication between the steam-supply pipe and the chamber is interrupted, substantially as described.

3. The combination, with a steam-supply pipe and a pipe communicating with a source or means of water-supply, of a closed chamber having a water-inlet passage provided with an inwardly-opening check-valve, a water-exit and a steam-exit, valves for controlling the admission of steam from the supply-pipe to said chamber and for controlling the said water and steam exits, and a float connected with said valves and operating to alternately admit steam from said pipe to said chamber and to exclude it therefrom, and to close said water-exit and open said steam-exit during the time that the steam-inlet is closed, substantially as described.

4. The combination, with a tank containing water under steam-pressure and a steam-supply pipe which is independent of said tank, of a chamber constructed and arranged to receive water from the tank by gravity, and provided with a suitable automatic valve in the inlet-pipe for preventing the backward flow of water therein, and with a water-exit, automatic means for alternately admitting steam from said supply-pipe to said chamber and cutting it off therefrom, automatic means for closing the said water-exit, and automatic means for equalizing the pressure between the said tank and the said chamber during the time that the communication between said supply-pipe and said chamber is closed, substantially as described.

5. The combination, with the closed receptacle E, having a water-inlet provided with a check-valve, of the float L, the valve-casing F, communicating with the top of the receptacle, and provided with passages $k$, $f'$, $k'$, and $f$, the tube $e$, the valve M, and the rod $l$, secured to said float and provided with the valve $k'$, substantially as and for the purposes set forth.

In testimony that I claim the foregoing as my invention I affix my signature in presence of two witnesses.

EUGENE F. OSBORNE.

Witnesses:
   W. H. RICHARDSON,
   THEO. BURKHARD.